United States Patent Office 3,337,479
Patented Aug. 22, 1967

3,337,479
PREPARATION OF CATION-EXCHANGE RESINS
Hamish Small, Midland, Mich., assignor to The Dow Chemical Company, Midland, Mich., a corporation of Delaware
No Drawing. Filed May 31, 1966, Ser. No. 553,625
13 Claims. (Cl. 260—2.2)

This application is a continuation-in-part of application S.N. 219,738, filed by Hamish Small on Aug. 27, 1962, and now abandoned.

This invention concerns an improved process for the preparation of cation-exchange resins by reaction of an insoluble halomethylaromatic resin to introduce active or potentially active cation-exchange groups. More particularly the process involves using a halomethylaromatic resin containing a limited number of quaternary ammonium or sulfonic groups as the intermediate resin in this process. The hydrophilic groups markedly improve the compatibility of the resin with water-soluble reagents used to introduce cation-exchange capacity.

Ion-exchange resins are often prepared by adding functional ionic groups to an insoluble resin matrix such as a cross-linked polyvinylaromatic resin. Commercial techniques for sulfonation or halomethylation and amination of such resins are highly developed. Amination of halomethylaromatic resins with trimethylamine and other soluble aliphatic amines is generally straightforward.

In the synthesis of more complex cation-exchange resins, a problem frequently occurs in reacting the hydrophobic halomethylaromatic resin with a reagent such as sodium sulfite and similar functional inorganic salts soluble in polar solvents such as water or aqueous alcohol. The problem involves not only the intrinsic reactivity of the reagents, but also their solubilities. To react with halomethyl groups dispersed within a resin matrix, the functional inorganic salt must diffuse throughout the resin. Such penetration is enhanced by swelling the resin with a solvent in which the reagent is soluble. Yet solvents which swell a hydrophobic halomethylaromatic resin are generally unsuitable for the ionic, functional inorganic salts which are soluble in water and other polar hydroxylic solvents. Such polar liquids are quite ineffective in swelling a hydrophobic resin to expose the halomethyl groups beneath the resin surface.

It has now been discovered that by using a halomethylaromatic resin containing a limited number of hydrophilic quaternary ammonium or sulfonic groups distributed throughout the resin matrix, the compatibility of the resin with polar hydroxylic solvents and hence the process for preparing cation-exchange resins by reaction of such a halomethylaromatic resin with a functional inorganic salt is markedly improved. More specifically, this invention is an improved process for the preparation of cation-exchange resins by reacting a halomethylaromatic resin with a water-soluble functional inorganic salt to introduce a cation-exchange group which employs as an essential element a halomethylaromatic resin having an average of from 0.50 to 1.25 substituent groups per aromatic group which consist essentially of:

(1) From 0.05 to 0.45 hydrophilic methylene-quaternary ammonium (I) or sulfonic (II) groups per aromatic group, said hydrophilic groups having the formula:

$$-CH_2NR_1R_2R_3Y \quad (I)$$

or $$-SO_3M \quad (II)$$

wherein $R_1$, $R_2$ and $R_3$ are independently $C_1-C_6$ alkyl, $C_1-C_4$ monohydroxyalkyl, or $C_3-C_4$ dihydroxyalkyl groups; Y is a monovalent anion, and M is a monovalent cation; and (2) From 0.45–1.20 chloromethyl or bromomethyl groups per aromatic group.

The improved process is illustrated by reaction of a chloromethyl polyvinylaromatic resin and an aqueous solution of a functional sodium salt, NaZ:

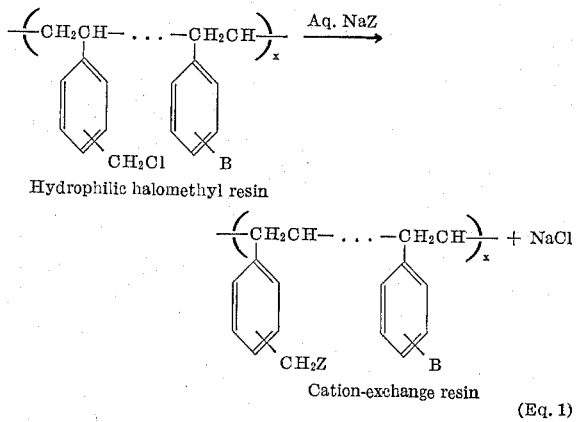

(Eq. 1)

wherein

B is a hydrophilic methylene quaternary ammonium or sulfonic group; and

Z is an active cation-exchange group.

HYDROPHILIC HALOMETHYLAROMATIC RESINS

For a high capacity cation-exchange resin, the intermediate resin should have at least 0.45 and preferably 0.60 or more chloromethyl or bromomethyl groups per aromatic nucleus. The optimum number of hydrophilic substituents, within the range from 0.05–0.45 groups per aromatic group, depends on the nature of the resin and substituent, but in general about 0.1–0.3 hydrophilic groups per aromatic nucleus is preferred. With more than about 0.45 hydrophilic groups per aromatic group, the number of possible halomethyl groups is usually below a desired level.

The substituent hydrophilic and halomethyl groups should be distributed throughout the resin matrix in an essentially uniform manner to obtain optimum characteristics. Obviously a resin with the hydrophilic groups restricted to a thin surface layer would not swell in a polar solvent to expose the halomethyl groups buried within the resin mass. The essentially uniform distribution of the hydrophilic groups can be verified by microscopic examination of the resin particles. Particles substituted in a non-uniform manner show characteristic demarcation lines when viewed with normal or polarized light.

Suitable hydrophilic halomethylaromatic resins can be obtained in a variety of ways. Advantageously the structural matrix is a commercial copolymer of styrene and from 0.25–20 weight percent divinylbenzene. However resinous polymers of styrene, vinyltoluene, chlorostyrene, or ethylstyrene cross-linked with a monomer such as divinylbenzene, divinyltoluene, a diallyl ester, methylene-bis-acrylamide, or ethyleneglycol diacrylate can also be used.

Introduction of the hydrophilic quaternary ammonium or sulfonic groups and the essential halomethyl groups is achieved by convention techniques. For example, after chloromethylation to introduce about 0.5–1.25 halomethyl groups per aromatic group, the chloromethylaromatic resin can be partially aminated with a tertiary amine of the formula: $NR_1R_2R_3$ wherein $R_1$, $R_2$ and $R_3$ are independently $C_1-C_6$ alkyl, $C_1-C_4$ monohydroxyalkyl, or $C_3-$ $C_4$ dihydroxyalkyl groups to form from 0.05–0.45 methylene quaternary ammonium groups per aromatic group. Suitable tertiary amines include trimethylamine, dimethylaminoethanol, dimethylisopropanolamine, methyldiethanolamine, 1-diethylamine-2,3-propanediol, trimethanolamine and triethanolamine as well as mixtures thereof. The extent of the partial amination is controlled under normal conditions by the amount of amine used.

To promote an essentially uniform partial amination throughout the halomethylaromatic resin, amination should be carried out under mild conditions in the presence of an organic liquid which swells the resin and is miscible with the amine. Amination at 0°–35° C. in the presence of a chlorinated solvent such as methylene chloride or dichloroethane is particularly suitable. Other solvents used in the synthesis of quaternary ammonium anion-exchange resins can also be used. The residual halomethyl content of the partially aminated halomethylaromatic resin is readily determined by standard methods.

Alternately a limited number of sulfonic groups ($-SO_3M$) can be introduced into the aromatic resin by partial sulfonation before or after halomethylation. Usually it is preferable to sulfonate first. Indeed the low-capacity sulfonated polyvinylaromatic cation-exchange resin described by Wheaton and McMahon in U.S. Patent 3,133,030 is quite suitable as the hydrophilic halomethyl-aromatic resin after chloromethylation. The intermediate sulfonic resin is normally used in salt form after neutralization with a water-soluble base such as sodium carbonate, potassium hydroxide, ammonia or trimethylamine.

Another type of halomethylaromatic resin is a water-insoluble halomethyldiphenyl ether resin such as described by Doedens in U.S. Patent 2,911,380. These resins are condensation polymers of halomethyldiphenyl ether having an average of from 1.1–4.0 halomethyl groups per diphenyl ether. A particularly useful form is obtained by the spray polymerization of chloromethyldiphenyl ether as described by Raymond and Ball in U.S. Patent 3,240,725. By conversion of a limited number of the residual halomethyl groups to quaternary ammonium groups of Formula I, or by partial sulfonation, the compatibility of these halomethyldiphenyl ether resins with polar hydroxylic solvents is also enhanced.

Choice of a partially aminated or partially sulfonated halomethylaromatic resin as an intermediate in the synthesis of the cation-exchange resin is dependent on the properties desired in the final resin. The hydrophilic methylene quaternary ammonium or sulfonic groups will influence the cation-exchange properties of the resin. For a high cation-exchange capacity a hydrophilic sulfonic group is generally preferred. However, partial amination has an advantage in process simplicity.

CATION-EXCHANGE RESINS

To convert the intermediate hydrophilic halomethylaromatic resin into the desired cation-exchange resin, the halomethyl groups are reacted in a polar hydroxylic solvent with a functional inorganic salt to introduce active or potentially active cation-exchange groups. (Cf. Equation 1.)

As used herein the term "polar hydroxylic solvent" refers to such solvents as water, $C_1$–$C_8$ aliphatic mono- and polyhydric alcohols including methanol, ethanol, propylene glycol, 1,4-butanediol and lower monoalkyl ethers and esters of $C_2$–$C_8$ polyhydric alcohols as well as mixtures thereof. Because of the diversity of the reagents which can be used, no one polar hydroxylic solvent will be optimum for all systems. Judicious choice must be made based on properties of the particular reagent and intermediate resin. For many systems water, methanol, ethanol, isopropanol or mixtures thereof are satisfactory.

The term "functional inorganic salt" refers to an inorganic salt which through formation of a new covalent bond with a benzylic carbon can introduce into a halomethylaromatic resin an active cation-exchange group or a potentially active group convertible into an active cation-exchange group by simple hydrolysis. Typical examples of such functional inorganic salts are sodium cyanide, potassium thiocyanate, ammonium sulfite as well as alkali metal salts of active methylene compound such as sodium acetoacetic ester and sodium malononitrile. Other suitable inorganic salts will be apparent to those skilled in the art.

Functional inorganic salts suitable herein are further characterized by: (1) a structure which provides cation-exchange group, (2) a solubility of at least 5 percent in a polar hydroxylic solvent, and (3) a reactivity such that said salt when mixed with stoichiometric amount of benzyl chloride in aqueous alcohol at 20–100° C. will displace at least 5 mole percent of the chloride therefrom in 48 hours.

To achieve high yields and reaction rate, an excess of the functional reagent is generally desirable, e.g. about 1.2 to 5 equivalents of the functional inorganic salt based on the halomethyl content of the intermediate resin. The reaction of the intermediate halomethylaromatic resin and the functional reagent is normally carried out at about 50–120° C. for a suitable time, usually 2 to 48 hours, at atmospheric pressure. However, a moderate elevated or reduced pressure can be used if desired.

The following examples illustrate further the present invention. Unless otherwise stated, all parts and percentages are by weight.

Example 1

(A) A slurry of 80 parts (0.76 mole) of 50–100 mesh styrene-divinylbenzene beads (1% divinylbenzene) and 800 parts of chloromethyl ether was refluxed for two hours after adding 60 parts of anhydrous zinc chloride. The recovered chloromethylated resin contained an average of 1.00 $-CH_2Cl$/aromatic group was slurried in 460 parts of methylene chloride and cooled to about 10° C. Then 13.6 parts (0.153 mole; 20 mole percent based on $-CH_2Cl$ content of the resin) of dimethylaminoethanol was added. Amination was carried out by stirring the resin slurry for one hour at about 10° C. and then for one hour at reflux. After cooling and washing with methanol, 217 parts of wet resin (59% solids) containing 0.80 residual $-CH_2Cl$ groups/aromatic group was recovered.

(B) To a slurry of the chloromethyl methylenedimethyl-β-hydroxyethyl ammonium resin described in Example 1(A) in water was added 8 moles of sodium sulfite per mole residual $-CH_2Cl$. After refluxing for 4 hours, the resin was recovered, washed with water and air dried. The resulting cation-exchange resin had a dry weight capacity (D.W.C.) of 1.28 mmoles $Cu^{++}$/g.

Example 2

Using another chloromethyl quaternary ammonium resin essentially the same as that described in Example 1(A), a weak-acid carboxylic cation-exchange resin was prepared by reacting the residual chloromethyl groups with an aqueous solution excess potassium cyanide in 80% aqueous methanol at reflux for 4 hours. The reacted resin was recovered and refluxed for several hours with 50% sulfuric acid to hydrolyze the nitrile groups. The recovered carboxylic polyvinylaromatic resin had a dry weight capacity of 0.88 mmole $Cu^{++}$/g. and contained about 37 percent moisture.

Example 3

A slurry of chloromethylated styrene-divinyl-benzene resin beads (containing 0.81 mole $-CH_2Cl$) in methylene chloride was aminated with 44 parts (0.179 mole) 24 percent aqueous trimethylamine at about 18° C. The partially aminated resin contained 0.18 mole methylene quaternary ammonium and 0.63 mole residual chloromethyl groups, an average of about 0.22 quaternary ammonium and 0.78 chloromethyl groups per aromatic group. This resin reacted with an aqueous solution of sodium sulfite as described in Example 1(B) gave a cation-exchange resin.

Example 4

A slurry of 40 parts (0.38 mole) of styrene-divinylbenzene resin (0.75% DVB) in 520 parts of methylene chloride was cooled in a Dry Ice bath. Then 8.8 parts (0.075 mole; 20 mole percent) of chlorosulfonic acid was added to the stirred slurry and the mixture allowed to warm gradually to room temperature over a period of 16 hours. The partially sulfonated polyvinylaromatic resin was isolated, washed thoroughly with methanol and then chloromethyl methyl ether. Then it was refluxed for 2 hours with a mixture of the sulfonated resin 400 parts of chloromethyl methyl ether and 30 parts anhydrous zinc chloride to obtain a sulfonated halomethylaromatic resin containing about 0.20 sulfonic and 0.80 chloromethyl groups per phenyl group. A portion of this resin in sodium salt form was reacted with excess aqueous sodium sulfite to form a methylenesulfonic acid cation-exchange resin.

Example 5

As a general test of operability in the present process, the reactivity of the functional inorganic salts is determined with benzyl chloride. Thus to 0.25 ml. (2.18 mmoles) of benzyl chloride in 25 ml. of 65% aqueous ethanol was added 2.0 ml. of a 1.0 molar aqueous solution of the inorganic salt. If desired 5 ml. of 1 N sodium acetate can be added as a buffer. The mixture was shaken at room temperature for about 17.5 hours. After diluting with 25 ml. of aqueous ethanol and acidifying with dilute sulfuric acid, the mixture was titrated potentiometrically for chloride ion. A correction for the reaction of benzyl chloride and aqueous solvent is made.

Data on the reactivity of several functional inorganic salts are given in Table 1.

TABLE 1.—REACTIVITY

| Reagent | mmoles Cl- | | Percent Reaction |
|---|---|---|---|
| | Total | Corrected | |
| Blank | 0.21 | 0 | |
| $Na_2SO_3$ | 1.82 | 1.61 | 80.5 |
| KSCN | 2.05 | 1.84 | 92 |
| NaCN [1] | 1.94 | [1] 1.94 | 97 |

[1] Without sodium acetate buffer.

I claim:
1. In a process for the preparation of a cation-exchange resin by reacting an insoluble halomethylaromatic resin with a water-soluble functional inorganic salt to bond cation-exchange groups to the aromatic resin, the improvement which comprises reacting:
   (A) A halomethylaromatic resin having an average of from 0.50 to 1.25 substituent groups per aromatic group, said substituents consisting essentially of:
      (1) From 0.05 to 0.45 hydrophilic methylene quaternary ammonium (I) or sulfonic (II) groups per aromatic group, said hydrophilic groups having the formulas:

$$-CH_2NR_1R_2R_3Y \quad (I)$$
or
$$-SO_3M \quad (II)$$

wherein
   $R_1$, $R_2$ and $R_3$ are independently $C_1-C_6$ alkyl, $C_1-C_2$ monohydroxyalkyl, or $C_3-C_4$ dihydroxyalkyl groups;
   Y is a monovalent anion which does not hinder reaction of the residual halomethyl groups; and
   M is a monovalent ammonium or alkali metal cation; and (2) From 0.45–1.20 chloromethyl or bromomethyl groups per aromatic group; with
   (B) A solution of a functional inorganic salt in a polar hydroxylic solvent selected from the group consisting of water, $C_1-C_8$ aliphatic mono- and polyhydric alcohols, lower monoalkyl ethers and esters of $C_2-C_8$ polyhydric alcohols, and mixtures thereof, said functional inorganic salt being characterized by: (1) a structure which provides a cation-exchange group, (2) a solubility of at least 5 percent in said polar hydroxylic solvents, and (3) a reactivity such that said salt when mixed with a stoichiometric amount of benzyl chloride in aqueous alcohol at 20–100° C. will displace at least 5 mole percent of the chloride therefrom in 48 hours;
to incorporate in the aromatic resin active cation-exchange groups or potentially active cation-exchange groups selected from the group consisting of nitriles, thiocyanates and esters which can be converted into an active cation-exchange group by simple hydrolysis.

2. The process of claim 1 wherein the hydrophilic group is a methylenedimethyl($\beta$-hydroxyethyl) ammonium group.

3. The process of claim 1 wherein the hydrophilic group is a methylenetrimethyl ammonium group.

4. The process of claim 1 wherein the hydrophilic group is an alkali metal sulfonate.

5. The process of claim 1 wherein the halomethylaromatic resin is a chloromethylated polyvinylaromatic resin containing from 0.05–0.45 methylene quaternary ammonium groups per aromatic group.

6. The process of claim 1 wherein the halomethylaromatic resin is a water-insoluble polymer of chloromethyldiphenyl ether containing from 0.05–0.45 methylene quaternary ammonium groups per aromatic group.

7. The process of claim 1 wherein the halomethylaromatic resin is a water-insoluble sulfonated polyvinylaromatic resin containing from 0.05–0.45 sulfonic and 0.45–1.20 chloromethyl groups per aromatic group.

8. The process of claim 2 wherein the functional inorganic salt is sodium sulfite.

9. The process of claim 2 wherein the functional inorganic salt is sodium cyanide.

10. The process of claim 1 wherein a water-insoluble styrene-divinylbenzene resin containing from 0.1–0.3 methylene quaternary ammonium and from 0.6–0.95 chloromethyl groups per aromatic group is reacted with excess aqueous sodium sulfite to yield a cation-exchange resin having a dry weight capacity of at least 1.20 mmoles $Cu^{++}/g$.

11. A cation-exchange resin consisting essentially of a water-insoluble aromatic resin matrix having substituted thereon from 0.50–1.25 substituent groups per aromatic group, said substituents consisting essentially of:
   (A) From 0.05–0.45 hydrophilic methylene-quaternary ammonium (I) or sulfonic (II) groups per aromatic group, said hydrophilic groups having the formulas:

$$-CH_2NR_1R_2R_3Y \quad (I)$$
or
$$-SO_3M \quad (II)$$

wherein
   $R_1$, $R_2$, and $R_3$ are independently $C_1-C_6$ alkyl, $C_1-C_4$ hydroxyalkyl or $C_3-C_4$ dihydroxyalkyl groups:
   Y is a monovalent anion which does not hinder reaction of the residual halomethyl groups; and
   M is a monovalent ammonium or alkali metal cation; and
   (B) From 0.45–1.20 active cation-exchange groups per aromatic group or from 0.45–1.20 potentially active cation-exchange groups per aromatic group, said potentially active cation-exchange being selected from the group consisting of nitriles, thiocyanates and esters which can be converted into active cation-exchange groups by simple hydrolysis.

12. The cation-exchange resin of claim 11 wherein the aromatic resin is a polyvinylaromatic resin.

13. The cation-exchange resin of claim 12 containing from 0.1–0.3 methylene quaternary ammonium and from 0.6–0.95 methylene sulfonic groups per aromatic group, said resin having a dry weight capacity of at least 1.20 mmoles $Cu^{++}$/g.

References Cited
UNITED STATES PATENTS

| | | | |
|---|---|---|---|
| 2,764,563 | 9/1956 | McMaster et al. | 260—88.1 |
| 3,252,921 | 5/1966 | Hansen et al. | 260—2.2 |

WILLIAM H. SHORT, *Primary Examiner.*

C. A. WENDEL, M. GOLDSTEIN, *Assistant Examiners.*